United States Patent

[11] 3,571,845

| [72] | Inventors | Eugene G. Martin;<br>Roland P. Gehman, Stevens; Edgar H.<br>Smith, New Holland, Pa. |
|---|---|---|
| [21] | Appl. No. | 781,232 |
| [22] | Filed | Dec. 4, 1968 |
| [45] | Patented | Mar. 23, 1971 |
| [73] | Assignee | MGS, Inc.<br>Denver, Pa. |

[54] CHICKEN-SLAUGHTERING MECHANISM
34 Claims, 13 Drawing Figs.

[52] U.S. Cl. .................................................. 17/11
[51] Int. Cl. ....................................... A22c 21/00
[50] Field of Search .......................................... 17/11, 12

[56] References Cited
UNITED STATES PATENTS

| 2,210,377 | 8/1940 | Onorato et al. | 17/11 |
| 2,306,773 | 12/1942 | Biffinger | 17/11 |
| 3,477,092 | 11/1969 | Simmons | 17/11 |
| 3,490,092 | 1/1970 | Harrison | 17/11 |

Primary Examiner—Lucie H. Laudenslager
Attorney—C. Hercus Just

ABSTRACT: Chicken-slaughtering mechanism having a conveyor to move chickens suspended by the feet into position for an operator to dispose the necks in slots formed in propelling means and opening upwardly to readily receive the necks and thereby positively move said chickens with their necks positioned substantially horizontally and twisted to position one side for the jugular vein to be incised to a limited controlled depth by a disc knife, and also including means to engage the opposite side of each neck from that penetrated by the knife to fully position the necks in said slots while a neck-stretching roller engages the necks of the chickens to stretch the same in opposition to the slotted propelling means and thereby dispose the skin of the neck in taut condition for efficient incising of the jugular vein close to the jaw as the neck is moved past the power-driven knife.

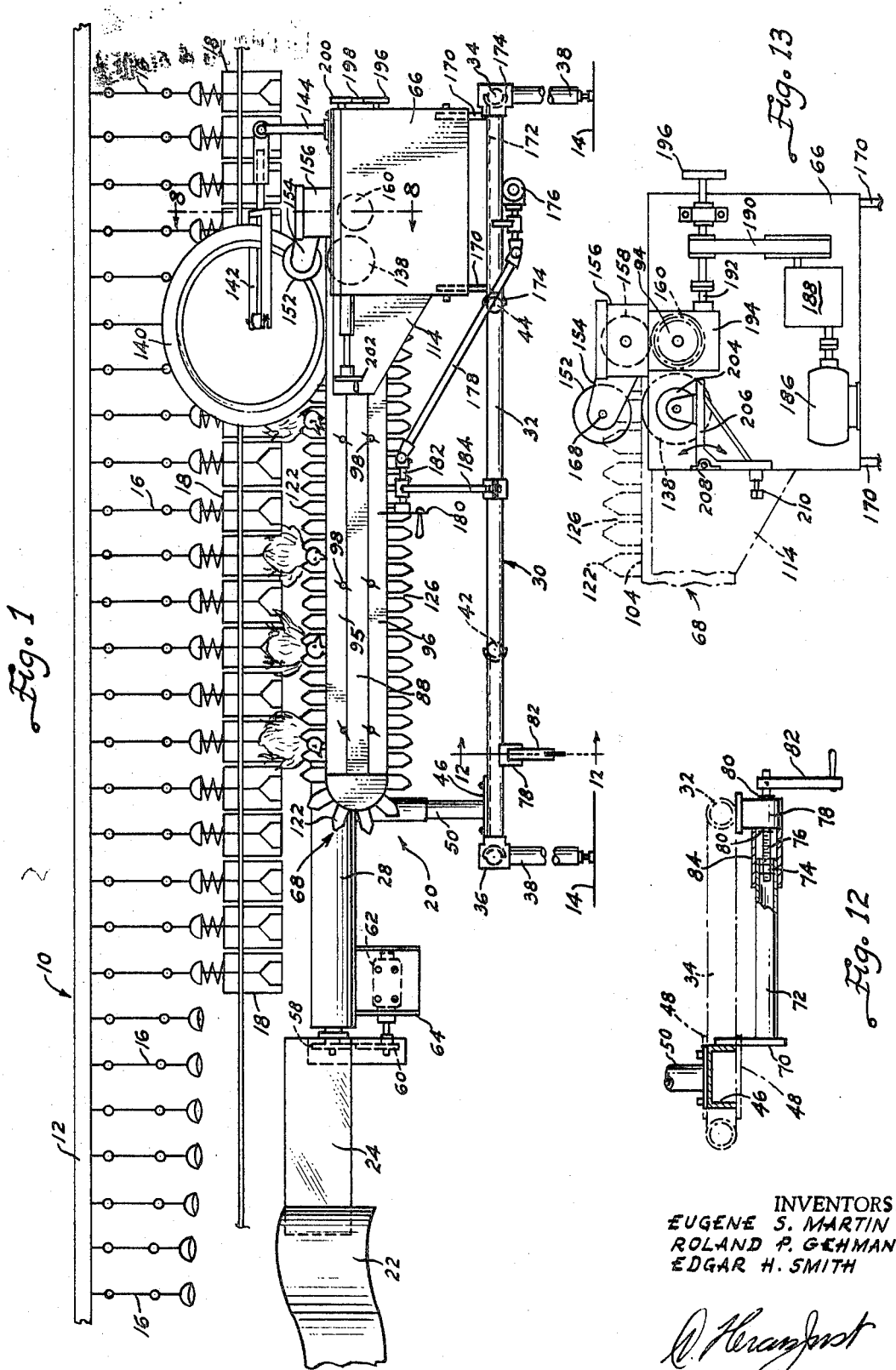

PATENTED MAR 23 1971 3,571,845
SHEET 2 OF 3
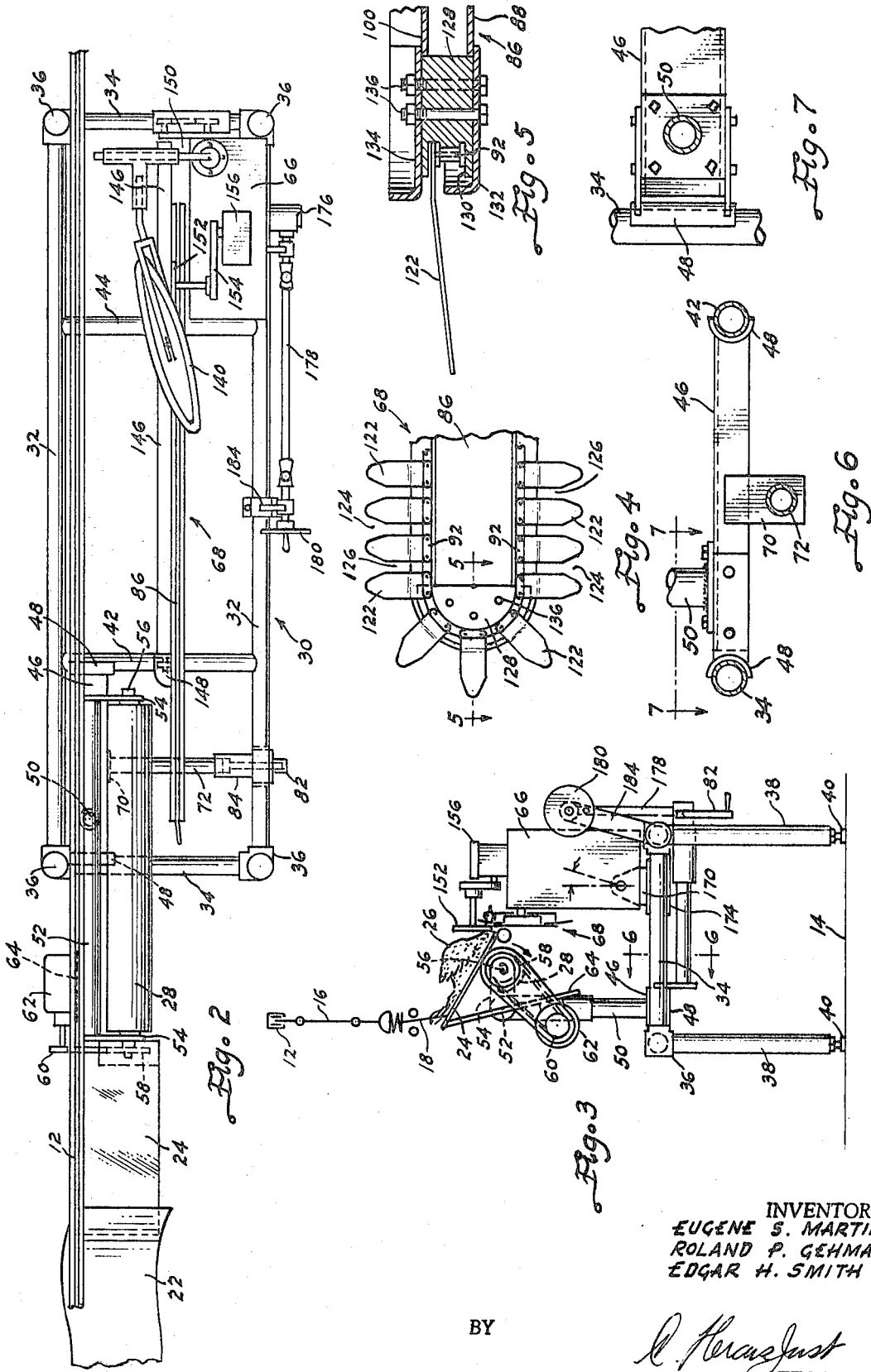
INVENTORS.
EUGENE S. MARTIN
ROLAND P. GEHMAN
EDGAR H. SMITH
BY
*R. Heraldjust*
ATTORNEY

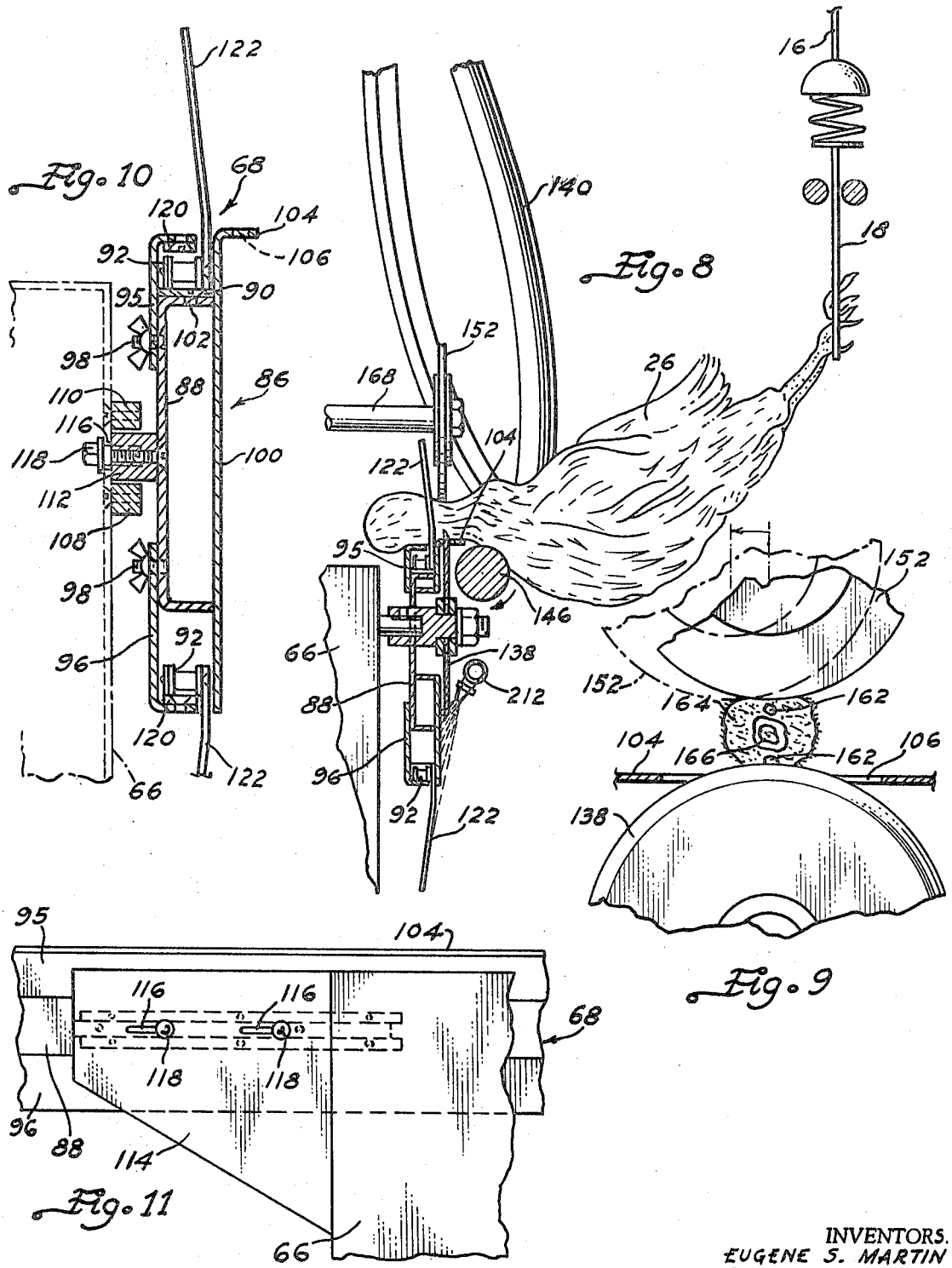

CHICKEN-SLAUGHTERING MECHANISM

BACKGROUND OF THE INVENTION

The chicken-slaughtering industry, in recent years, has undergone a limited amount of mechanization, particularly for purposes of reducing labor costs. To accomplish this, conveyor means of different types have been developed to suspend a row of chickens, usually by engaging the legs or feet thereof, whereby the chickens depend downwardly therefrom and are moved to a slaughtering station where operators manually endeavor to sever only one of the jugular veins of the chickens in order to induce ready bleeding of the chickens prior to the same being advanced to other operations such as mechanism which remove the feathers, followed by dressing operations of various kinds which are largely of a manual nature.

In order to maintain the price of dressed poultry at a competitive level, it is necessary to expedite the manual operations involved in the slaughtering and dressing of chickens and also eliminate as many manually performed operations as possible by the substitution of mechanized means therefor. To achieve these objectives, the speed at which live chickens are moved past operators who manually incise the necks presently is at the rate of between 4,000 and 5,000 chickens per hour. Considering such speeds of operation, it is obvious that even the most expert operator finds it difficult to consistently sever only a jugular vein in the neck of each chicken and preferably make the incision immediately adjacent the jawbone so that as much meat and skin as possible will be left on the carcass in the neck thereof after the head ultimately is severed from the neck.

The principal reason for incising or penetrating only the jugular vein in the neck of a chicken incident to slaughtering the same is that if the vertebrae or spinal column is severed, shock is induced instantly in the entire carcass which immediately closes the pores of the skin and tightens the grip thereof upon the feathers, thereby rendering the picking operation more difficult than under circumstances where only the jugular vein is severed and no such shock is induced. This fact has been appreciated in the past but mechanisms thus far developed for purposes of either expediting or mechanizing the slaughtering of chickens has not included any means which accurately insures the severing of only the jugular vein to any satisfactory degree.

PERTINENT PRIOR ART among the most pertinent prior patents pertaining to the slaughtering of chickens, are 3 patents in the name of Onorato et al., these being U.S. Pat. Nos. 2,152,082; 2,152,083; and 2,210,377. In addition, U.S. Pat. No. 2,306,773, to Biffinger, issued in 1942, involves the slitting of chickens' while the bills or beaks of chickens are impaled upon pointed prongs which position the necks of the chickens relative to knife means. Such operation, however involves the manual impaling of the beaks or bills of the chickens upon the pointed prongs. Further U.S. Pat. No. 3,243,839, issued in 1966 to Norwood, primarily pertains to a certain type of knife mechanism for slitting the throats of chickens. None of these patents offer the innovations and advantages of the present invention

SUMMARY OF THE INVENTION

It is the principal object of the present invention to provide chicken-slaughtering mechanism which advances chickens by a flexible conveyor having shackles thereon to suspend the chickens by the legs or feet therefrom and deliver them to longitudinally movable slotted means of appreciable depth and opening upwardly so that the necks of chickens may be quickly disposed manually in one of said slots so as to be positively propelled into contact with a rotatable knife having only limited exposure of its cutting edge to make substantially uniform cuts or incisions of predetermined depth in one side of the necks of the chickens, preferably very close to the jawbone and only adequate to penetrate one of the jugular veins, this operation being insured by the use of neck-stretching means operable in opposition to the slotted propelling means which engages the heads of chickens immediately behind the jaws and thereby stretches the skin of the neck taut for engagement by said knife, said stretching means preferably comprising an elongated roller of small diameter positively driven in stretching direction.

It is another object of the invention to hold the heads of the chickens uniformly in said slotted propelling means as moved toward the knife and just prior to reaching the knife, positively driven means roll or twist the neck to dispose a side thereof lowermost in one of the slots of the advancing means so as to position a jugular vein nearest the knife and thereby insure that a desired minimum depth of cut will occur which penetrates said vein but not the vertebrae.

It is still another object of the invention to effect such rolling or twisting of the necks of the chickens by a positively driven disc above said knife and having a peripheral speed sufficiently different from that of the feed speed of said propelling means that the neck will be rotated approximately 90°about its axis so as to position one side of the neck and especially the jugular vein in that side immediately adjacent said knife, said disc also insuring that the necks will be positioned in the lowest depth of the slots of said propelling means.

It is a further object of the invention to utilize arranging means to shift the bodies of chickens, as they approach the slotted propelling means, from an initial vertically depending position to a forwardly inclined position and thereby facilitate the engagement of the heads of the chickens by an operator incident to disposing the necks in one of the slots of said slotted propelling means, said arranging means preferably being in the form of a substantially horizontal and somewhat twisted cam means which initially engage the bodies of the chickens and extends them to a somewhat horizontal posture, such action being augmented, if desired, by elongated roller means which rotate in a direction to pull said chickens away from the shackles and thereby further dispose the chickens in the desired inclined position for such engagement by the operator, as aforesaid.

One further object of the invention is to provide said propelling means in the form of a series of spaced fingers pivotally interconnected and guided around curved members at opposite ends of said propelling means, whereby as said fingers move around said curved members respectively at the inlet and discharge ends of said propelling means, the outer ends of said fingers are spread apart a greater distance than when moving along between said ends of said propelling means, thereby to facilitate the reception of the necks of chickens between the fingers at the entrance end and facilitate the discharge of the necks of chickens therefrom at the exit end of said propelling means.

Still another object of the invention is to provide compact and effective, as well as adjustable drive means for moving the slotted propelling means longitudinally toward the knife, rotating the disc knife, revolving the rotatable pressure member which is mounted in opposition to the disc knife, an driving the neck-stretching means which preferably comprises a longitudinally extending roller of suitable diameter, nearly all of said power means being enclosed in a single cabinet or housing which is mounted preferably for limited transverse adjustment with respect to a supporting frame so as to move the assembly toward and from the portion of the chicken-suspending conveyor which is adjacent the slotted propelling means and preferably parallel thereto adjust the mechanism to accommodate chickens of different lengths.

Details of the foregoing objects and of the invention, as well as other objects thereof, are set forth in the following specification and illustrated in the accompanying drawings comprising a part thereof

DESCRIPTION OF THE DRAWINGS

FIG. 1 is a side elevation of a chicken-slaughtering mechanism embodying the principles of the present invention, part of the suspending conveyor associated therewith being shown only fragmentarily and the supporting legs of the frame of the mechanism being foreshortened.

FIG. 2 is a top plan view of the slaughtering mechanism shown in FIG. 1.

FIG. 3 is an end view of the slaughtering mechanism shown in FIGS. 1 and 2 as seen from the left-hand end thereof.

FIG. 4 is a fragmentary vertical elevation of the left-hand end of the slotted propelling mechanism shown in FIG. 1.

FIG. 5 is a fragmentary horizontal sectional view of the mechanism shown in FIG. 4, on a slightly enlarged scale thereover, as seen on the line 5–5 of said figure.

FIG. 6 is a fragmentary, vertical sectional elevation of part of the frame mechanism shown in FIG. 3, as seen on the line 6–6 of said figure, and illustrated on a larger scale than employed in FIG. 3.

FIG. 7 is a horizontal fragmentary sectional elevation as seen on the line 7–7 of FIG. 6.

FIG. 8 in an enlarged, fragmentary, exemplary vertical elevational view, as seen on the line 8–8 of FIG. 1, illustrating the preferred manner of positioning the neck of a chicken in the slotted propelling means at the time of incising the neck by the rotary knife of the mechanism.

FIG. 9 is a fragmentary, enlarged, vertical sectional view illustrating in exemplary manner the preferred method of incising the jugular vein in the neck of a chicken by the mechanism illustrated in FIG. 8.

FIG. 10 is an enlarged, partially vertically sectioned end elevation of the slotted propelling means and the mechanism for supporting the same, generally as seen from the right-hand end of the apparatus shown in FIG. 1.

FIG. 11 is a fragmentary side elevation of the left-hand end portion of the power cabinet and supporting means for the propelling means of the mechanism shown in FIG. 1 and illustrated on a scale enlarged over that employed in FIG. 1.

FIG. 12 is a fragmentary vertical sectional elevation of details of the mechanism shown in FIG. 1, as seen on the line 12–12 thereof and illustrated on a larger scale than employed in the latter figure.

FIG. 13 is an enlarged side elevation of the power cabinet of the mechanism shown in FIG. 1, the same being illustrated with the cover removed to show details included therein.

DESCRIPTION OF THE PREFERRED EMBODIMENTS

The preferred construction of the chicken-slaughtering mechanism illustrated in the above-described figures is intended primarily to be illustrative of the general principles and certain essential details of a mechanism for the intended purpose which is very largely automatic in operation and capable of incising the necks of chickens to a uniform, predetermined but limited depth preferably to penetrate only a jugular vein, as the chickens are successively moved to knife means included in the mechanism. To a accomplish the desired objectives with a minimum amount of manual effort, the illustrated chicken-slaughtering mechanism comprises chicken-suspending and conveying means 10 which includes a track 12 supported preferably stationarily a suitable distance above a supporting surface, such as a floor 14, by appropriate hangers and the like, not shown. The track 12 preferably is of an endless configuration and is mounted so as to support a suitable flexible chain or the like within the track 12 and from which a plurality of suspending members depend, such as shackles 16.

The shackles 16 preferably are of a commercial type commonly employed in chicken-processing plants and comprise suitable link means which dependingly support wire frames shaped to define a pair of narrow, elongated loops within which the legs of a chicken may be quickly engaged so as to suspend the chicken in a downwardly depending manner for movement to the slaughtering mechanism 20 which comprises the essential feature of the present invention. At an appropriate loading station, such as at a suitable position to the left of the portion of the track 12 shown in FIG. 1, chickens are removed manually from containers or the like, such as appropriate crates, by an operator who quickly positions the legs of each chicken successively in one of the shackles 16.

Under preferred conditions, the successive shackles 18 are each "loaded" with a chicken and in order to accomplish this, depending upon the speed at which the shackles 16 are moved along the conveyor 12, it may be necessary for two or more operators to load the shackles so that substantially each successive shackle preferably supports a chicken. This can be done by each operator placing a chicken successively in shackles which are spaced apart a predetermined number of shackles and other operators load the intervening shackles in a similar manner. Colored markers facilitate this.

Appropriate power means, not shown, move the endless arrangement of shackles 16 along the path of the track 12 from the loading station, past the slaughtering mechanism illustrated in FIG. 1, for example, and then to a discharge station, not shown, either with or without first subjecting the chickens to mechanisms for subsequent operations, such as picking machines, where the feathers are removed, and various dressing operations.

As the chickens are successively moved along the path of the track 12, they are suspended in depending manner from the shackles 16. A subsequent manual step in the desired procedure to be performed by the mechanism comprising the present invention requires that the necks be positioned suitable in propelling means comprising part of the slaughtering mechanism 20, details of which are described hereinafter. To facilitate the engagement of the necks by a attendant or operator, the mechanism 20 also preferably comprises a stationary body-positioning cam 22 which may be formed from appropriate sheet metal or the like, such as stainless steel. If desired, the initially engaged cam 22 leads the chickens onto an additional positioning cam 24 which, in end view, preferably slopes downwardly and forwardly from the row of shackles 16 which carry the chickens into engagement with the cams 22 and 24, as is shown in FIG. 3, and in which figure an exemplary chicken 26 is illustrated in sliding engagement with the secondary cam 24.

The principal purpose of the cam 24 is to appropriately and easily slidably move the chickens to propelling means which receives the necks thereof, described hereinafter. Hence, the principal objective is to move the depending bodies of the chickens from a depending position toward a horizontal position with the necks and heads projecting forwardly for reception within said propelling means, which may be accomplished automatically, if desired. Additional, intermediate body-poistioning means, if desired, may be used which comprise an elongated roller 28 of relatively large diameter in relation to the length of the chicken 26, for example, as may be seen from FIG. 3. The roller 28 also preferably is power-driven by an independent motor and such power means as well as the supporting means for the roller and cam members 22 and 24 are as follows.

The entire slaughtering mechanism 20 comprising the essential parts of the present invention preferably is supported by a stationary frame 30 which may be composed of suitable structural members of adequate size. In the present illustration, the frame member has been shown as being composed of tubular members such as appropriate steel pipe. Referring to FIG. 2, the frame preferably comprises two main, parallel longitudinal members 32 which are supported in spaced relationship by end members 34, all of said members being rigidly interconnected by appropriate angular tees 36. An appropriate leg 38 extends downwardly from each of the tees 36 and the lower ends thereof preferably have threadably adjustable feet 40 which engage the supporting floor surface 14, for example, in a manner to permit leveling of the main frame 30 to dispose it in a substantially horizontal position. A plurality of intermediate cross-frame members 42 and 44 are disposed between the side frame members 32 and are parallel to the end members 34. If desired, the members 42 and 44 may be secured by welding the ends thereof to the side frame members 32.

A cross-strut 46 of suitable construction extends between the left-hand end frame member 34 and intermediate frame member 42, as viewed in FIG. 2, the same having concave guide members 48 on the opposite ends which are complementary to and are also slidable relative to the innermost surfaces of the transverse frame members 34 and 42 as shown in FIG. 6. Extending vertically upward from the movable supported cross-strut 46 is a pedestal 50 which, at its upper end, is rigidly fixed to a horizontally extending member 52 which supports at least one end of cam members 24 and also supports roller 28 when such roller is desired to be used.

Projecting forwardly from the opposite ends of the member 52, and fixed thereto, are a pair of parallel arms 54 which are provided with bearings in the outer ends thereof to rotatably support a shaft 56 which extends through roller 28 and is fixed thereto. A driven gear or pulley 58 is fixed to the left-hand end of the shaft 56, as viewed in FIG. 2, and the same is driven by a driving gear or pulley 60 connected to one end of the shaft of motor 62. Said motor is supported by a suitable plate 64 depending from the member 52. A suitable control for the motor 62 preferably is located within the power housing or cabinet 66 and comprises an appropriate switch.

Referring to FIG. 2, the line of movement of the section of the track 12 which moves past the slaughtering mechanism shown in FIG. 2 is represented by a single line in the upper portion of the figure. It will be seen from this view and especially in relation to the end elevation in FIG. 3, that the roller 28 is disposed below and forwardly from the path of the track 12. Accordingly, when chickens suspended from the shackles 16 are moved toward the right as viewed in FIG. 1 and 2, they engage in succession the several cam members 22 and 24. If roller 28 is desired, they are then disposed upon the periphery of the roller 28 which, as shown by the directional arrow in FIG. 3, is revolved clockwise by the motor 62. Said cams and/or the roller 28 result in the chickens being successively moved toward the horizontal and disposed in an angular position with the heads and necks projecting forwardly for ready grasping of said heads and necks thereof by an operator to place the same in propelling means 68 comprising a finger-supporting chain, details of which are described hereinafter. For reasons also explained hereinafter, such manual placement of the necks may be eliminated, or at least curtailed, if desired. It will be appreciated from FIG. 3 in particular, however, that in order for the mechanism to accommodate chickens of different sizes and especially different lengths, whereby the bodies thereof must be engaged by the cam means 22 and 24 and for positioning roller 28, so that the bodies extend between the shackles 16 and the propelling means 68, at least cam means 24 and the axis of the roller 28 preferably should be adjustable transversely relative to the portion of the track 12 which carries the shackles 16 longitudinally past the roller 28.

To effect such transverse adjustment of roller 28, simple but effective means are illustrated in FIGS. 2, 3 and 12. Referring particularly to FIG. 12, it will be seen that a plate 70 is connected to and extends downwardly from cross-strut 46 which supports the frame for roller 28. A tube 72 is connected at one end to plate 70 and the opposite end thereof has a nut 74, for example, fixed within the same for reception of a threaded shaft 76 therein. The shaft 76 extends through a bearing 78 for rotatably support thereby and suitable snaprings or keys 80 prevent longitudinal movement of the shaft 76 with respect to bearing 78.

A manually operable crank 82 is fixed to the outer end of shaft 76. If desired to enhance the guiding tube 72 for transverse movement relative to the side frame members 32, an additional guide sleeve 84 may be fixed relative to bearing member 78 which, in turn, is supported fixedly by the adjacent side frame member 32, as best shown in FIG. 13. Upon rotation of the crank 82 in opposite directions, the cross-strut 46 is correspondingly moved in opposite directions transversely between the opposite side frame members 32 and thereby carries the body-positioning roller 28 toward and from the track 12 along which the chickens are moved when suspended in shackles 16.

The propelling means 68 preferably comprises a longitudinally extending frame 86 which, as show in detail particularly in FIG. 10, comprises, in the preferred construction, a flat channel 88, the upper flange of which supports a suitable bearing strip 90 along which the upper course of an endless series of pivotally connected links 92 slide, as propelled by a sprocket 94 shown in FIG. 13. The connected links 92 actually form a chain which preferably somewhat resembles a form of bicycle-type chain.

To facilitate the mounting of the connected links 92 with respect to the longitudinal frame 86, and also to form suitable path-defining means for said links, which actually comprise what shall be termed a finger chain, a pair of half-channels 95 and 96, which are L-shaped in cross section as shown in FIG. 10, and also are coextensive in length with the flat channel 88, are connected by appropriate bolts and wingnuts 98 to the channel 88 respectively adjacent the upper and lower flanges thereof so as to form guide channels respectively for the upper and lower courses of the finger chain comprising links 92.

Extending across and longitudinally of the open face of the flat channel 88 is a closure and guide plate 100. To secure the same to the channel 88 of longitudinal frame 86, the bearing strip 90 is appropriately fixed to one face of the plate 100, such as by welding or the like, and a series of screws 102, see FIG. 10, extend through appropriate holes in the strip 90 and into threaded holes in the upper flange of the flat channel 88. The upper edge of plate 100 also is bent transversely to the plane thereof to provide a guide member comprising a flange 104 which, at a predetermined longitudinal location therein, has a narrow knife-receiving slot 106 formed therein, for purposes to be described.

The frame 86 for the finger chain is adjustable supported for relative longitudinal movement by the exterior of the inner walls of power cabinet 66, as shown in FIG. 10. Such support is effected by providing a pair of parallel guide bars 108 and 110 which are fixed, by a series of appropriate rivets or screws, in spaced relationship to each other, to said outer surface of the power housing 66, as also illustrated in FIG. 10. Said guide bars slidably receive therebetween a slide bar 112 which, for simplicity, is preferably approximately square in cross section and is of a somewhat larger diameter than the guide bars 108 and 110.

The flat channel 88 of longitudinal frame 86 is fixed to one face of the slide bar 112 by appropriate screws shown in FIG. 10. Also, by referring to FIG. 11, it will be seen that the power housing 66 preferably has a vertical extension 114 which is fixed to and is in the same plane as the inner wall of the power housing 66. Said extension actually comprises the principal support for the frame 86 for the finger chain and it will be seen that the extension 114 is provided with a pair of slots 116 through which guide and clamping bolts 118 extend for engagement with appropriate tapped holes formed in the slide bar 112 as shown in FIG. 10. When the bolts 118 are tightened, the frame 86 is secured firmly to the power housing 66 in such manner that the left-hand end of the frame extends in cantilever manner from said housing.

The half-channel 96 preferably has a bearing strip 120 connected to the inner face thereof for slidable engagement by the finger chain comprising links 92 and, similarly, a corresponding bearing strip 120 is fixed to the inner face of the upper half-channel 94, the same being adequately spaced from the bearing strip 90 on channel 88 to freely and slidably receive the finger chain therebetween but sufficiently close that no appreciable tilting of the individual links from their normal longitudinal path is possible, for the following reasons.

Referring to FIG. 4 especially, it will be seen that the alternate links 92 have similar fingers 122 appropriately connected thereto, such as by rivets, bolts or welding so as to project radially from said links. Particularly as shown in FIGS. 1 and 4, it will be seen that the fingers 122 have substantially parallel sides but the outer ends of the fingers are tapered so that the outer ends of successive fingers form inwardly tapered openings 124 which facilitate the introduction of the necks of chickens into the slots 126 between the fingers. The width of the slots preferably are such that they readily slidably receive the necks of chickens of average size but said width is less than the transverse dimension of the heads of normal chickens which are intended to be processed by the apparatus comprising the present invention. It also will be seen that the longitudinal dimension of the slots are substantially greater than the width thereof to prevent unintended removal of the necks of chickens therefrom. Accordingly, when the neck of a chicken is disposed in one of said slots 126 and the same is pulled in a direction away from the edges defining said slots, the jaws of the head of the chicken will be abutted against the side edges of the fingers defining the slots 126. The head will not move through said slots and thus dislodge the same from the fingers, to achieve purposes to be described hereinafter.

Referring to FIG. 5, the outermost end of the longitudinal supporting and guide frame 86 is provided with an appropriate arcuate member 128 which, as shown in FIG. 4, for example, is semicircular in plan view. Said member preferably is formed from suitable bearing material such as bronze, brass or the like, and an appropriate arcuate guide channel 130 is formed in the periphery thereof, the ends of said channel coinciding with the adjacent ends of the channels of which the bottoms are defined by bearing strips 90 and 120 of the longitudinally extending straight portions of the frame 86. Complementary side plate members 132 and 134 are secured by bolts 136 to opposite faces of the arcuate guide member 128.

The guide member 128, in effect, supports one "end" of the endless finger chain composed of links 92, and the sprocket 94 supports the other "end" of said finger chain. The longitudinal adjustability of the frame 86 with respect to the power housing 66, by which the sprocket is supported for movement about a fixed axis, permits the finger chain to be placed under desired tension so as preferably to have a minimum amount of slack, whereby the fingers 122, particularly along the upper course of the finger chain, are disposed in vertical, parallel relationship with respect to each other during normal operation of the mechanism. Also, as the finger chain moves around arcuate guide member 128, the fingers 122 will be spread at the outer ends, into an acute angular relationship.

It will be seen particularly from FIG. 1 that there are preferably a reasonably greater number of fingers 122 and, correspondingly, a greater number of slots 126 than there are shackles 116. This is for the intentional purpose of providing an advantageous aspect of the present invention in that it is preferred that the linear movement of the conveying means 10 shall be relatively high, whereby the necks of chickens can by automatically introduced to slots 124 at the leading end of frame 86, or it is conceivable that without undue effort, a single operator can positively and manually dispose the necks of chickens in the slots 126 of the propelling means 68 at the rate of at least approximately 5,000 chickens per hour or higher. Accordingly, as the chickens are moved to the leading end of the propelling means 68 at the aforementioned rates of delivery, the operator moves very quickly to grab the forwardly extending heads of the chickens, as thus positioned by the cam member 24 and/or roller 28, and instantaneously disposes the necks thereof in the nearest appropriate slot 126 adjacent the shackle 16 which is supporting any individual chicken. The provision of two or three appropriate slots for each shackle renders this function highly satisfactory and permits very efficient operation of the entire mechanism.

The principal function of the propelling means 68 is to move the necks of the chickens positively and inescapably into engagement with the knife means by which preferably only the jugular vein of a chicken is incised or penetrated to a depth adequate to induce ready bleeding, without severing the vertebrae and thereby avoiding shock being induced which renders the plucking or picking operation difficult. Referring to FIG. 8, it will be seen that the substantially ideal position of a chicken 26, while its neck is being incised, is somewhat angular in side elevation but the major component of the angle and especially the neck is approximately horizontal. That is desirable in that, as the necks of the successive chickens are moved toward the power cabinet 66, as viewed in FIGS. 1 and 2, the slots 126 which receive the necks of the chickens are of such depth relative to the width that they maintain the necks inescapably within said slots but without undue binding, to permit limited twisting of the necks.

As the chickens closely approach the knife means 138, which preferably comprises a disc knife having a very sharp periphery, the backs of the chickens, adjacent the neck, are engaged by a preliminary positioning means 140, one convenient and practical form of which comprises a somewhat relatively free-floating member such as a bicycle wheel which has a pneumatic tire thereon so as not to bruise the necks or bodies of the chickens as the same pass beneath the periphery thereof. Said wheel or any mechanical equivalent thereof is supported by an appropriate fork 142 which is pivotally mounted upon the upper end of a suitable pedestal 144 fixed conveniently to the top of power housing 66, for example. Such preliminary engagement of the means 140 with the backs and necks of the chickens 26 insures disposing the heads and necks thereof substantially to the full depth within the slots 126 between the fingers 122. This function also performs another desirable operation and insures the effectiveness thereof, as follows.

In the commercial processing of chickens, it presently is desirable that as much of the skin and flesh of the neck, immediately adjacent the head, be retained upon the carcass after the head per se is severed therefrom. Accordingly, it is desirable that the incising of the jugular vein of the chicken occur as close to the jawbone in the head of the chicken as possible. To achieve this, the present invention includes a neck-stretching means which, in the preferred embodiment of the invention, comprises a longitudinally extending roller 146 which is rotatable about a fixed axis, by means described hereinafter, in clockwise direction as viewed in FIG. 8. The roller 146 preferably is of relatively small diameter so as readily to be accommodated to chickens of various sizes within reasonable limits. One highly successful example comprises a roller of approximately 2 inches in diameter. The length of the roller, however, is such that it extends in a direction parallel to the path of movement of the necks of the chickens from a position forwardly beyond the preliminary positioning means 140, to a location past the knife means 138, adjacent the discharge end of propelling means 68, as can be seen in FIG. 2.

The neck-stretching roller 146 is supported at its opposite ends by any appropriate means such as bearing 148, shown in FIG. 2, which is supported by one face of the frame 86 of propelling means 68. The opposite end is supported in a suitable bearing provided in the outer end of a laterally extending arm 150, shown in FIG. 2, affixed, for example, to one end wall of power cabinet 66. The roller 146 is positively driven, in clockwise direction, as shown by the indicating arrow in FIG. 8, by means to be described. The principal function of the roller 146 is to stretch the neck of the chicken 26 so as to pull the jawbones thereof into reasonably close abutment against the sidewalls of the slots 126 which are defined by the fingers 122 and thus stretch not only the necks but especially the skin on the necks so as to be taut when engaged by the peripherally sharpened edge of the knife means 138 which is positively rotated by power means, to be described.

Preferably at a vertical location above the disc knife means 138 is a member 152, one proven satisfactory example of which comprises a disc of limited thickness which is supported rotatably by the outer end of a cantilever arm 154, best shown in FIGS. 1 and 13. The arm 154 is supported by an appropriate housing 156 which surmounts the power cabinet 66. The arm 154 preferably is angularly adjustable relative to housing 156 by suitable means, not shown, to vary the periphery of disc member 152 relative to knife 138. The housing 156 contains a driven gear 158 which meshes with a driving gear 160 and by means of a sprocket chain or belt, the same drive rotatable member 152 preferably clockwise as viewed in FIG. 13. The lowermost portion of the periphery of member 152 which engages the necks of the chickens preferable is positioned a short distance forwardly in the feeding path of the chickens relative to the peripheral portion of the knife 138 which incises said necks, for reasons hereinafter set forth and such position may be varied as illustrated in FIG. 9.

Member 152 has a dual function, one of which is to firmly and effectively dispose the neck of each chicken substantially to the full depth of slots 124 and adjacent the upper surface of the guiding flange 104 through which only a predetermined very limited portion of the periphery of the incising knife 138 extends to penetrate preferably one of the jugular veins 162 in one side of the neck 164 of a chicken, as shown in exemplary manner in FIG. 9, whereby the vertebrae 166 preferably is not contacted and thus no shock is induced. Under normal conditions of operation, incising only one of the jugular veins 162, in one side of the neck, is fully adequate to induce profuse bleeding, substantially painlessly to the chickens, whereby subsequent plucking operations may occur without difficulty in contrast to the relatively difficult conditions induced by shock as when the vertebrae 166 is severed or at least the spinal cord therein is contacted.

The second and highly important function of the member 152, which is supported by and is positively driven rotatably about the axis of drive shaft 168, is that, whereas the heads and necks of the chickens are normally slidably moved longitudinally along the guide flange 104 with the heads disposed substantially in a vertical position, when the neck of each chicken is engaged by the rotatable member 152, the periphery thereof functions with respect to the stationary guide flange 104 and the side edges of fingers 122 to twist the neck preferably only approximately 90° so as to dispose one side of the neck in position to be engaged by the limited exposed periphery of the rotatable knife 138, in which position the jugular vein 162 in that side of the neck is disposed so as readily to be incised by said knife.

Referring to FIG. 13, wherein the predominant part of the power means is illustrated as being contained within the power housing 66, it will be seen that said housing is supported by a pair of upstanding bracket arms 170 which, at their lower ends, are connected to a transverse frame member 172 which is best illustrated in FIG. 1 The connection between the upper ends of the arms 170 and the sides of housing 66 preferably is pivotal. Connected to the opposite ends of the frame member 172 is a pair of semicircular guide members 174 which resemble the concave guide members 48 on cross-strut 46 which supports the frame by which the body-positioning means 24 and 28 are supported for movement longitudinally along the end frame member 34 and intermediate cross-frame member 42. As can be seen from FIG. 1, the semicircular guide members 174 respectively are slidably received upon the intermediate cross-frame member 44 and the right-hand end frame member 34 as viewed in FIG. 1.

The transverse frame member 172 preferably is movable transversely with respect to the opposite longitudinal side members 32 of the supporting frame 30 by mechanism similar to that shown in FIG. 12 which specifically is illustrated with respect to the cross-strut 46. As shown in FIG. 1, however, rather than employing a crank on the outer end of the threaded adjusting shaft 76, an appropriate right-angle gearbox 176 is mounted upon the front longitudinal frame member 32 for purposes of driving the corresponding threaded shaft 76 connected thereto.

By means of an angularly disposed drive shaft 178 and universal joints connected to opposite ends thereof, a hand crank disc 180, which is connected to a shaft 182 rotatably supported in a bearing at the upper end of standard 184 affixed to the front frame member 32, which shaft 182 is connected to the uppermost universal joint on drive shaft 178, the gearbox 178 is actuated in the desired direction of rotation to move the power housing 66, and the propelling means 68 carried thereby, transversely toward and from the line of movement of the conveying means 10 to accommodate chickens of different lengths. Desired limited angular positioning of housing 66 is possible by the pivotal connection thereof to arms 170.

Referring further to FIG. 13, in which it will be seen that the front cover of the power housing 66 has been removed, the principal power element of the entire mechanism is shown in the form of a suitable electric motor 186. The drive shaft for said motor is connected to a suitable variable drive unit 188 which is interconnected by suitable pulleys and belt means 190 to a driven shaft 192 which, through a suitable right-angular gearbox 194, drives the driving gear 160 by which the rotatable pressure and neck-twisting disc 152 is driven.

The outer end of shaft 192 supports a suitable sprocket gear or pulley 196 which, as seen in FIG. 1, drives a sprocket chain or belt 198 which drives corresponding sprocket gear or pulley 200 which is fixed to the outer end of the shaft of the neck-stretching roller 146 and rotates the same in clockwise direction as viewed in FIG. 8.

Under normal conditions of operation, only a single manual operator is required to dispose the necks of chickens within the slots 126 of the propelling means 68. He normally stands forwardly of the machine, adjacent frame 30 as viewed in FIG. 1, and near the hand crank disc 180. This enables such operator to both readily position the necks of the successive chickens within the slots 126 and also, when periodically necessary, to adjust the positions of the fingers and the corresponding slots 126 therebetween in a lateral direction with respect to the line of movement of the shackles 16. If the mechanism is arranged so that the necks of the chickens are fed automatically to the angularly widened slots 124 adjacent the entrance end of propelling means 68, as shown in FIGS. 1 and 4, full time need of an operator is not necessary but, under such circumstances, a so-called "back-up" man should be employed to insure smooth and desired operation of the system.

It is well-known that endless conveyors of any appreciable length, such as are contemplated for use in the conveying means 10, are subject to variation in the movement thereof, due to wear, the extent of the load thereon, and other factors. Nevertheless, it is preferably desired that at least that portion of the conveying means 10 which moves opposite to and parallel with the propelling means 68, shall move preferably substantially at the same linear speed as said propelling means. To accomplish this, the powered drive means within the power housing 66 includes a variable drive unit 188. The ratio of the input and output elements of said drive unit may be manually varied by the manipulation of a speed control wheel 202 which is shown in exemplary manner in FIG. 1. It also will be seen that the same is located in reasonable proximity to the hand crank disc 180, whereby the aforementioned single operator, whether "back-up" or otherwise, readily may manipulate the same appropriately to coincide the speed of the finger chain of propelling means 68 to that of the speed of the section of the conveying means 10 moving therewith. Such adjustment normally is not required frequently.

In order that the amount of the periphery of the circular knife means 138 which projects through the slot 109 in guide flange 104 may be varied in order to suit specific operating conditions, such as the age or size of the chickens being processed, the knife means 138 and the drive means therefor are vertically adjustable within reasonable limits. Referring to FIG. 13, it will be seen that the preferably disc-type knife means 138 is driven directly by another electric motor 204 which is supported upon an adjustable bracket 206.

The particular type of adjustable bracket 206 which is illustrated is intended only to be exemplary for purposes of illustrating one manner by which the projecting extent of the periphery of the knife means 138 may be varied. For example, the adjustable bracket 206 is substantially L-shaped in side elevation as shown in FIG. 13 and is pivotally supported adjacent the apex of the two arms of the bracket, by pintle means rotatably supported in bearing means 208 connected, for example, to one sidewall of the power housing 66. The depending leg of the bracket 206 is engageable, for example, by the inner end of a threaded adjusting bolt 210 which is operable from the exterior of the power housing 66, the same being rotatable in opposite directions respectively to raise or lower the motor 204 and the knife means 138 supported thereby.

From FIG. 8, it readily can be visualized that when the neck of a chicken is incised, profuse bleeding immediately occurs. Blood will flow onto fingers 122 and even on knife 138. To facilitate the minimizing of any accumulation of blood on these elements and any adjacent portions of the mechanism, the apparatus includes a jet nozzle 212 which delivers a preferably high intensity jet spray continually while the machine is in operation. The nozzle is located suitably to wash the fingers 122 on the lower course of the endless series thereof as they are moving back to the leading end of propelling means 68. The periphery of knife 138 is immediately rinsed as it moves from the neck of a chicken.

After the necks of successive chickens have been incised by the means described hereinabove, disengagement thereof from propelling means 68 is insured as the fingers 122 are angularly spaced as they pass around driving sprocket 160 for the endless series of connected fingers. Thereafter, the chickens are carried by the conveying means 10 to successive mechanisms or stations of operation, not shown. From the foregoing, however, it will be seen that it is possible, through the use of the nearly completely automatically operated slaughtering mechanism described hereinabove and shown in the accompanying drawings, to uniformly incise the necks of chickens in rapid and quick succession, under substantially ideal conditions requiring a minimum employment of manual labor.

While certain types of power means have been specifically illustrated and described as being electric motors, these have been intended to be merely illustrative rather than restrictive. For example, other power means such as fluid-operated motors, either liquid or gaseous, may be used in lieu of the electric motors shown at present. Only a single source of fluid under pressure, would be required, in which event a single electric motor only, at a somewhat remote location would be needed to operate a pump for the fluid pressure line. The minimizing of electric circuitry also is desirable for safety purposes, especially where a substantial amount of liquid is encountered in operating the machine, such as wash water.

We claim:

1. Chicken-slaughtering mechanism comprising in combination, chicken-suspending and conveying means engageable with the legs of a chicken and movable along a predetermined path, propelling means having a multiplicity of slots adjacent each other and opening upwardly to permit the neck of a chicken to be placed quickly thereon, said slots being appreciably longer that the width thereof to prevent disengagement of said neck therefrom, means operable to move said propelling means along a path in cooperation with said suspending and conveying means to insure positive movement of a succession of chickens thereby while suspended substantially therebetween, knife means positioned adjacent said path of said propelling means and operable to incise the neck of a chicken adjacent the head thereon, said propelling means being adapted to dispose the neck of each chicken substantially transversely to the plane of said knife means, and means operable to position the side of the neck of each chicken adjacent said knife means to incise only one of the jugular veins in said neck.

2. The chicken-slaughtering mechanism according to claim 1 in which said propelling means comprises a plurality of similar fingers of limited width and spaced apart even distances to provide said neck-receiving slots of substantially uniform width to propel said necks during the portion of the path thereof in which the same are moved into engagement with said knife means, and said means to move said propelling means comprising power drive means interconnected to said fingers and operable to propel the same along said path thereof at a predetermined speed similar to that of said suspending and conveying means.

3. The chicken-slaughtering mechanism according to claim 2 in which said plurality of fingers have substantially parallel side edges and said mechanism further including an endless assembly of pivotally interconnected links and means connecting one of said fingers to said links and from which said fingers project substantially perpendicularly, and said mechanism also including a frame having a guideway to support said pivotally interconnected links and control the movement thereof through said path of said propelling means.

4. The chicken-slaughtering mechanism according to claim 2 in which said suspending means comprises an endless conveyor and means to support the same for longitudinal movement along said predetermined path thereof, and said mechanism further including variable control means for said power drive means for said propelling fingers to orient the speed of said fingers relative to that of said conveyor.

5. The chicken-slaughtering mechanism according to claim 2 in which said conveyor is provided with suspending members arranged in evenly spaced relationship thereon and the spaces between said fingers of said propelling means being more numerous than said suspending members, whereby a plurality of said spaces are available selectively with respect to each suspending member to receive the neck of a chicken suspended from any individual suspending member and thereby permit substantially instantaneous placement of the necks of chickens within an operative space in said propelling means.

6. The chicken-slaughtering mechanism according to claim 1 in which said knife means comprises a sharpened disc knife, and said mechanism further including means to rotatably support said knife and drive it within said plane transverse to the necks of chickens when said chickens are suspended between said conveying means and said slotted propelling means, and said means operable to position the sides of the necks of said chickens adjacent said knife means also being arranged to maintain said necks in the slots of said propelling means for incising one of the jugular veins in the necks thereof.

7. The chicken-slaughtering mechanism according to claim 6 further including guide means engaged by the necks of chickens as propelled relative to said knife means by said conveying means and slotted propelling means, said sharpened disc knife being supported relative to said guide means so that only a very limited portion of the sharpened periphery thereof extends above said guide means for purposes of incising the neck of each chicken a corresponding limited amount adequate to penetrate the jugular vein in one side of the neck of the chicken.

8. The chicken-slaughtering mechanism according to claim 7 in which said guide means comprises a stationary guide member having a neck-supporting surface substantially parallel to the axis of said knife and immediately adjacent said slotted propelling means and parallel thereto, said guide means having a slot through which said limited portion of the periphery of said knife extends, thereby positively limiting the depth of an incision to be made by said knife in the neck of a chicken.

9. The chicken-slaughtering mechanism according to claim 6 further including pressure means supported adjacent said knife but spaced from said slotted propelling means and positioned to engage the back of a chicken as it moves toward said knife to further facilitate positioning the necks of chickens for transverse incision by said knife.

10. The chicken-slaughtering mechanism according to claim 1 further including a rotatable member positioned to engage the necks of chickens in opposition to said knife means and power means to drive said member in such direction that the peripheral portion thereof which engages the neck of a chicken is operable to twist said neck about the axis thereof to dispose one side of said neck for engagement by said knife means and thereby dispose the jugular vein therein in position to be incised by said knife means.

11. The chicken-slaughtering mechanism according to claim 1 further including neck-stretching means operable at least adjacent said knife means to engage the necks of chickens positioned within said slots of said propelling means and operable to pull the neck in a direction to abut the heads against the side edges of said slots of said propelling means and thereby render the skin on said neck taut for effective incising by said knife means.

12. The chicken-slaughtering mechanism according to claim 11 in which said neck-stretching means comprises a cylindrical roller mounted for rotation about an axis adjacent said knife means and substantially parallel to the path of movement of said propelling means and beneath the necks of chickens as moved toward said knife means by said propelling means, and said mechanism also including power means connected to said roller and operable to rotate it in such direction relative to said knife means that the upper surface of said roller moves away from said knife means and propelling means, thereby to pull the heads against said propelling means and stretch the skin of the necks of chickens relatively taut as aforesaid.

13. The chicken-slaughtering mechanism according to claim 12 in which the slots of said slotted propelling means are narrower that the width of the head of a chicken, whereby when said slots receive the necks of chickens and said neck-stretching roller moves in operative direction said roller operates to pull the opposite sides of said heads into firm abutment with the side edges of said slots.

14. The chicken-slaughtering mechanism according to claim 12 further including a rotatably supported pressure member positioned operably to engage the upper surface of the neck of a chicken adjacent said knife and in opposition thereto, and means to drive said pressure member in a direction to twist the neck of a chicken a predetermined amount to dispose one side in position to be incised to a predetermined depth by said knife means adequately to penetrate the jugular vein in said side of said neck.

15. The chicken-slaughtering mechanism according to claim 1 further including a slotted stationary guide member supported so as to be substantially parallel to said propelling means, said knife means comprising a power-driven disc knife, and adjustable means supporting said knife to project a limited portion of its periphery through the slot of said stationary guide member a variable predetermined amount to control the depth of incisions in the necks of said chickens.

16. The chicken-slaughtering mechanism according to claim 1 in which said suspending and conveying means is a conveyor having supporting members to receive the legs of a chicken and hold the chickens depending therefrom, and said mechanism further including body-arranging means positioned adjacent the receiving end of said propelling means and operable to engage the bodies of chickens as moved toward said propelling means and slidably incline said bodies upwardly a limited amount from said depending position thereof toward a substantially horizontal position, thereby to facilitate the positioning of the necks of chickens within the slots of said propelling means.

17. The chicken-slaughtering mechanism according to claim 16 in which said arranging means comprises an inclined cam member having a relatively broad surface over which the bodies of chickens are slidably moved in a direction substantially parallel to the path of movement of the portion of said conveyor adjacent said cam member and substantially to the leading end of said propelling means.

18. The chicken-slaughtering mechanism according to claim 17 further including roller means supported between said inclined cam and the leading end of said propelling means, and means to drive said roller about an axis generally parallel to said propelling means and in a rotary direction to engage the bodies of chickens when suspended from said conveyor and move them away from said conveyor to extend the necks of said chickens toward said propelling means for ready insertion of said necks in the slots thereof.

19. The chicken-slaughtering mechanism according to claim 1 further including a frame arranged to be disposed upon a supporting floor surface or the like and comprising members arranged to support all of said mechanism except said suspending and conveying means, means to support said suspending means independently of said frame, and adjustable positioning means on said frame operable to move the mechanism supported thereby laterally in opposite transverse directions relative to the path of movement of that portion of said suspending means which moves past said mechanism incident to supporting and moving chickens relative to said knife means for incising the necks thereof by said knife means.

20. The chicken-slaughtering mechanism according to claim 19 in which said frame means include transversely extending supporting and guide means interconnected to said mechanism to support the same upon said members, and said frame also including manually operable adjusting means interengageable with said mechanism and operable to move the same relative to said supporting and guide means of said frame means.

21. The chicken-slaughtering mechanism according to claim 19 further including a housing supported upon said frame, power means mounted within said housing and interconnected to said propelling means to drive the same, said knife means comprising a disc knife supported by a shaft and said shaft also being connected to said power means to rotate said knife, and means on said housing connected to said propelling means and shaft for said knife for support thereby.

22. The chicken-slaughtering mechanism according to claim 21 in which said propelling means is elongated and substantially parallel to the path of that portion of said suspending and conveying means which is adjacent said propelling means, said propelling means comprising elongated guide means, and means connecting one end portion of said guide means to said housing, whereby said propelling means is supported in cantilever manner by said housing.

23. The chicken-slaughtering mechanism according to claim 22 in which said propelling means comprises an endless series of pivotally connected fingers supported by said elongated guide means and extending along and around one end of said guide means, said fingers being spaced apart adequately to provide said slots to receive the necks of chickens therebetween as said fingers are moved along said elongated guide means to said knife, sprocket means supported by said housing and said series of fingers extending therearound to be driven thereby, and longitudinally adjustable means connecting said elongated guide means to said cabinet to render said one end of said guide means adjustable toward and from said sprocket means to adjust the tension of said endless series of connected fingers.

24. The chicken-slaughtering mechanism according to claim 1 in which said propelling means comprises a plurality of fingers flexibly interconnected into an endless series thereof, and said mechanism further including elongated guide means for said series of fingers having curved means at opposite ends around which said series of fingers move, said fingers being substantially parallel to each other and substantially perpendicular to said guide means while moving along at least one portion of said guide means to provide said neck-receiving slots between adjacent fingers operable to move said necks to said knife means for incision thereby, said knife means being positioned intermediately between said curved means at the ends of said guide means, and said fingers being disposed at acute angles relative to each other when moving around said curved means at the ends of said guide means, thereby to insure disengagement of the incised necks of chickens from said propelling means at one end thereof.

25. The chicken-slaughtering mechanism according to claim 24 in which one of said curved means of said guide means is a circular driven member operable to engage said endless series of fingers and drive the same relative to said guide means.

26. Chicken-slaughtering mechanism comprising the combination, a conveyor operable to support chickens in sequential relationship and move them along a predetermined path, propelling means provided with slots narrower than the heads of chickens to receive the necks of said chickens and movable in a direction to cooperate with said conveyor and move said chickens along said path, knife means adjacent the path of movement of said propelling means and operable to incise the necks of said chickens to a predetermined depth as said necks are moved along said path, and neck-stretching means engageable with the necks of chickens disposed in said slots of said propelling means prior to reaching said knife means and operable to pull the heads of said chickens against the edges of said slots and thereby stretch at least the skins of said necks taut for incision by said knife means.

27. The chicken-slaughtering means according to claim 26 in which said neck-stretching means comprises a roller supported for rotation about an axis substantially parallel to said path of movement of said necks of said chickens and the upper surface of said roller engaging said necks from beneath and being rotated in a direction to pull said necks away from said slots of said propelling means.

28. The chicken-slaughtering means according to claim 27 in which said roller is elongated and adapted for the necks of chickens to be slidably moved longitudinally along said roller by said propelling means for a predetermined distance prior to reaching said knife means and thereby insure adequate stretching of the necks.

29. Chicken-slaughtering mechanism comprising in combination, conveyor means operable to support chickens and move them in a feeding direction in said mechanism, knife means positioned adjacent said conveying means in line with the necks of chickens conveyed thereby, means positioned to precede said knife means and adapted automatically to engage the necks of chickens immediately prior to incision by said knife means and operable to engage and positively rotate the neck of each chicken to position one side thereof and the jugular vein therein to be engaged and incised by said knife means to a limited predetermined depth, whereby the vertebrae remains unsevered.

30. The chicken-slaughtering mechanism according to claim 29 further including propelling means movable parallel to said knife means and adapted to engage the necks of chickens and positively move them to and past said knife means for incision to a limited depth thereby.

31. The chicken-slaughtering mechanism according to claim 29 further including guide means adjacent said knife means and positioned for movement of the necks of chickens therealong and cooperable with said knife means to control the depth of incision by the same, and said means to position one side of the necks of chickens for incision by said knife means comprising a member engageable with the necks and mounted for movement in a direction to twist said necks a limited extent to dispose one side of the neck as aforesaid relative to said knife means.

32. The chicken-slaughtering mechanism according to claim 29 in which said means engageable with the necks of chickens comprises a positively driven rotatable member adjacent said knife means and positioned to engage said necks in opposition to said knife means.

33. The chicken-slaughtering mechanism according to claim 29 including guide means, said guide means being an elongated member having a guide surface thereon and said knife means is a disc knife adjacent said guide means, means rotatably supporting said knife for exposure of a predetermined extent of the periphery thereof relative to said guide means to control the depth of incision of the neck of a chicken by said knife, and said movable member engageable with the necks of chickens comprises a disclike member positioned for rotation in opposition to said knife and at least slightly in advance thereof in the direction of movement of chickens toward said knife, and power means connected to said disclike member and operable to rotate it in engagement with the necks of chickens sufficiently to twist the same to dispose a side thereof adjacent said knife prior to the same being contacted by said knife to permit said knife to incise said sides of said necks to a predetermined depth and the jugular veins therein.

34. The chicken-slaughtering mechanism according to claim 33 in which said elongated guide member is slotted to accommodate a portion of the periphery of said knife therethrough, and said mechanism further including means to support said knife for adjustable positioning of said periphery of said knife therethrough to control the depth of incision thereby.